Jan. 16, 1962    L. H. HOSBEIN    3,016,655
REFRACTORY LINING
Filed April 15, 1954    6 Sheets-Sheet 1

Inventor:
Louis H. Hosbein.
By Zabel, Baker, York, Jones & Dithmar
Attorneys

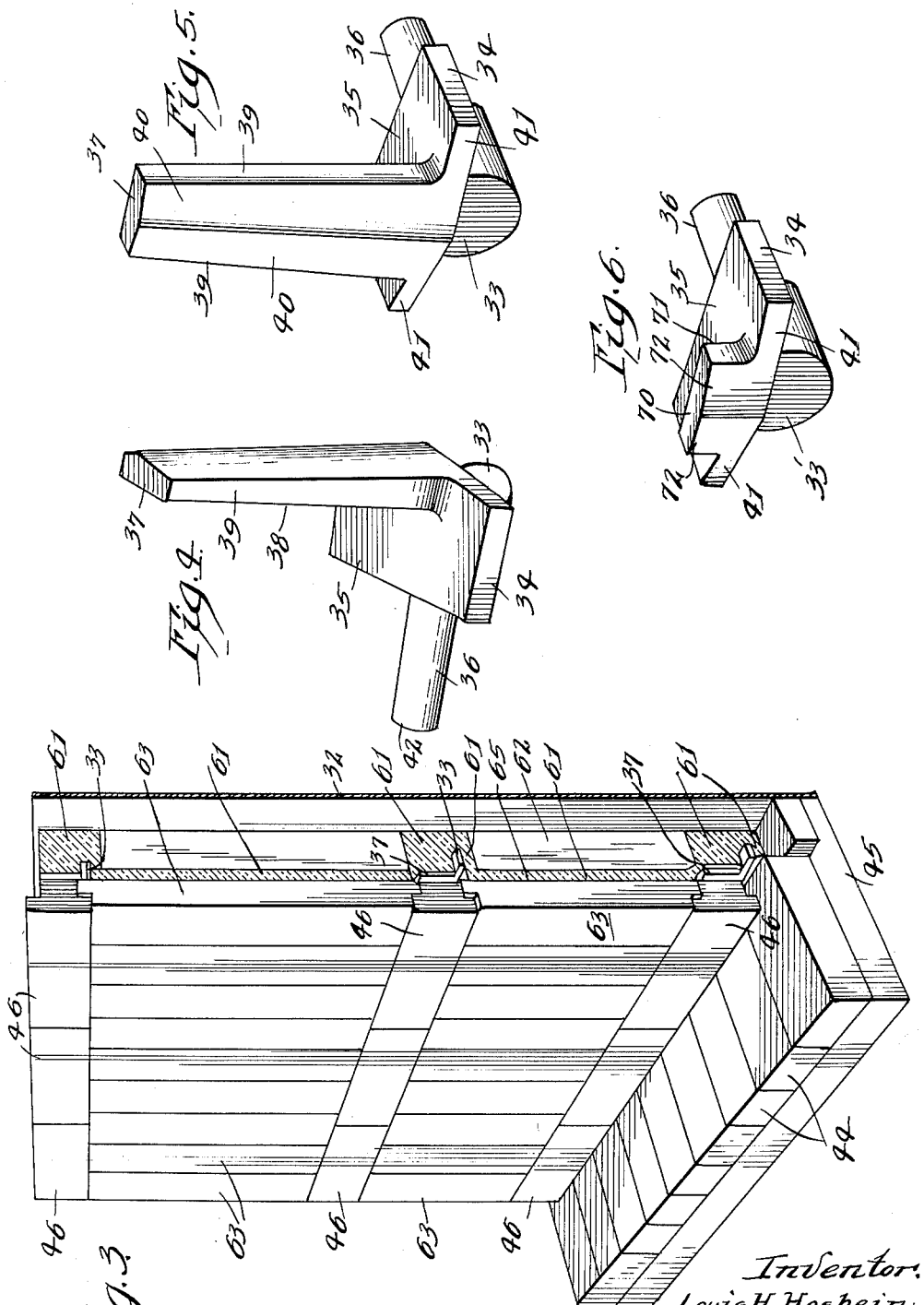

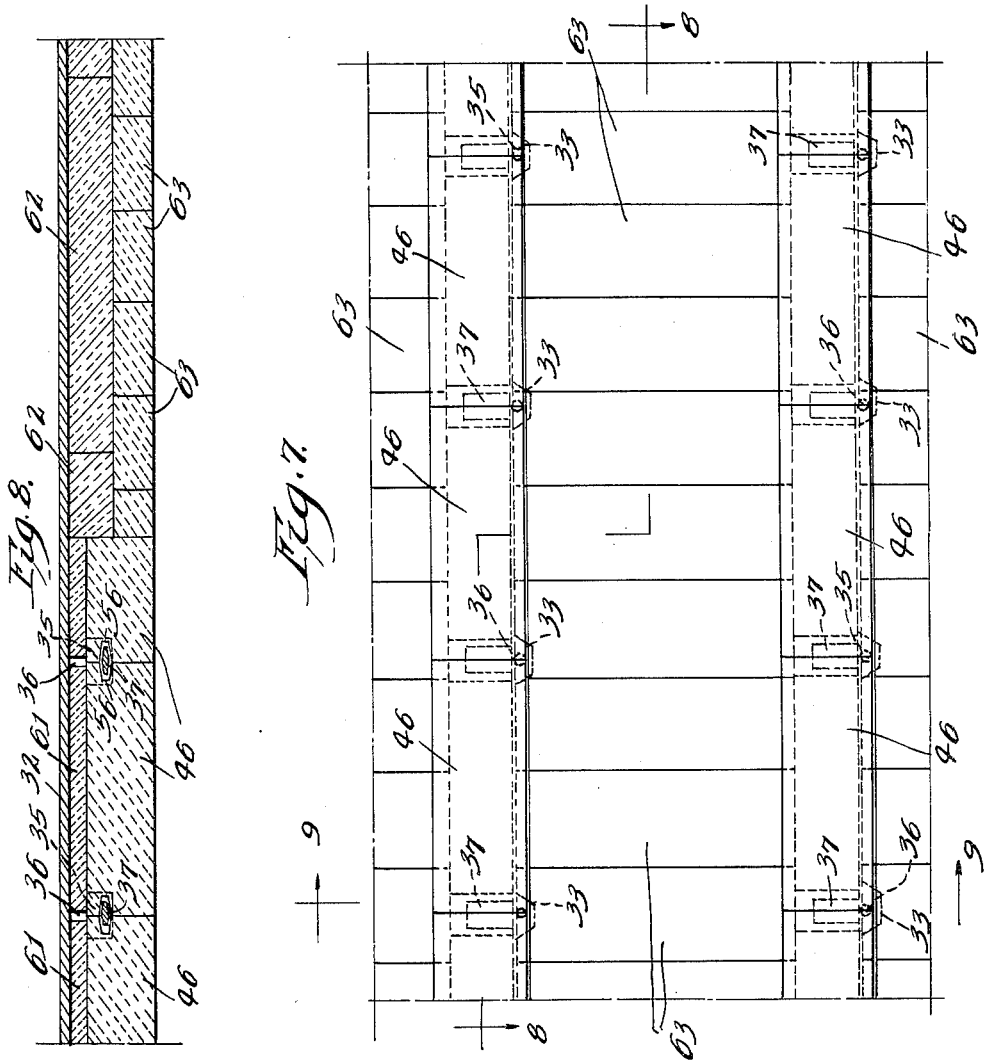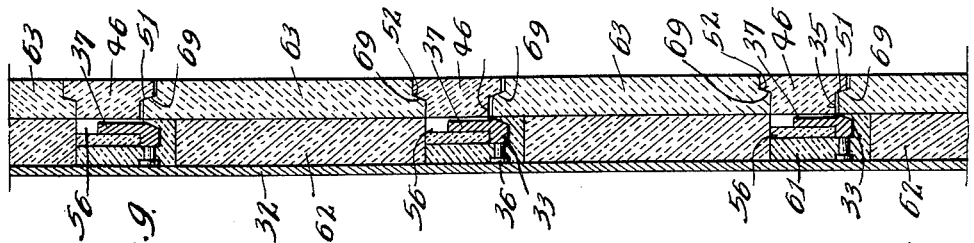

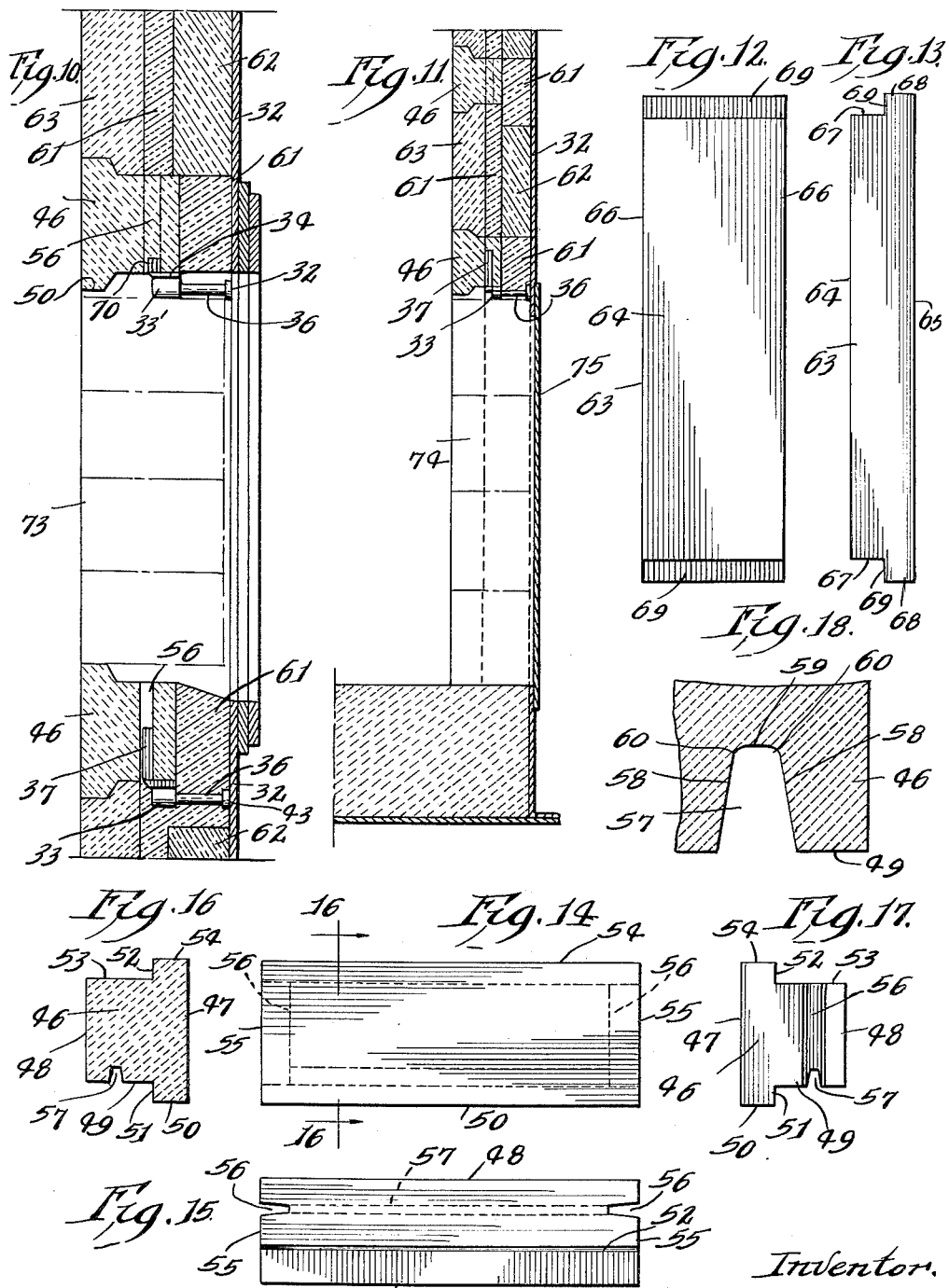

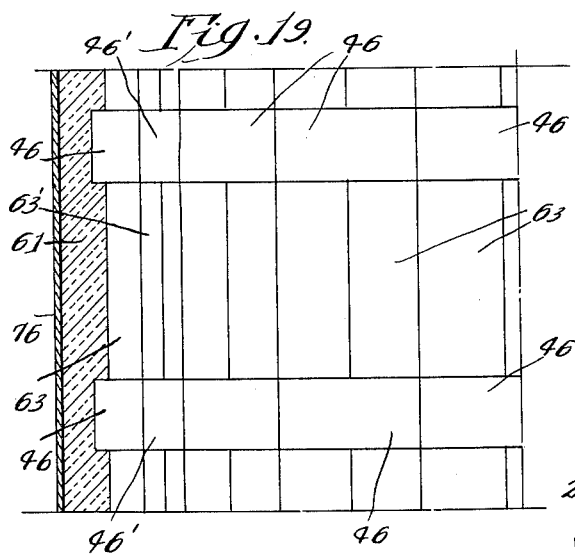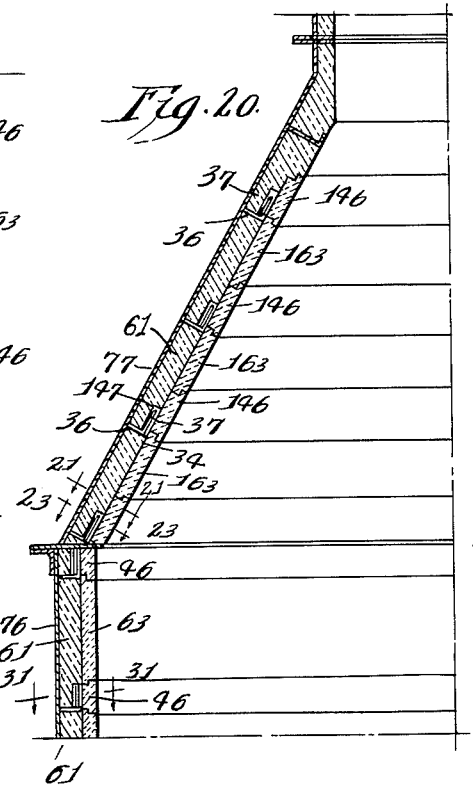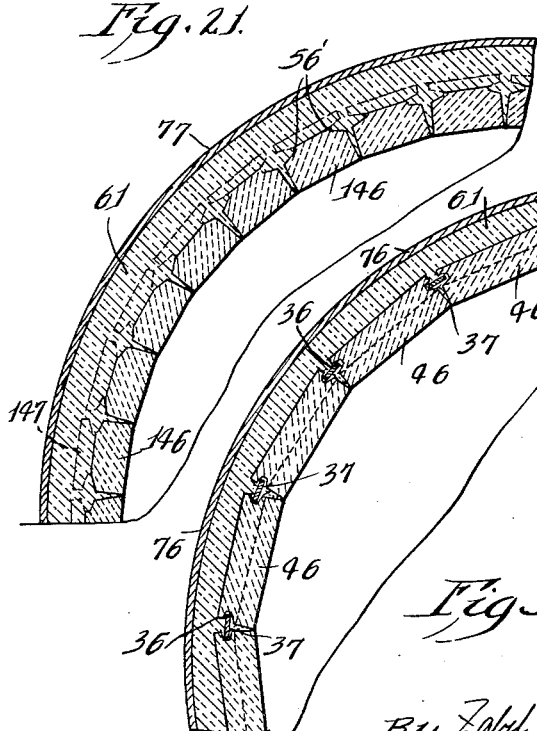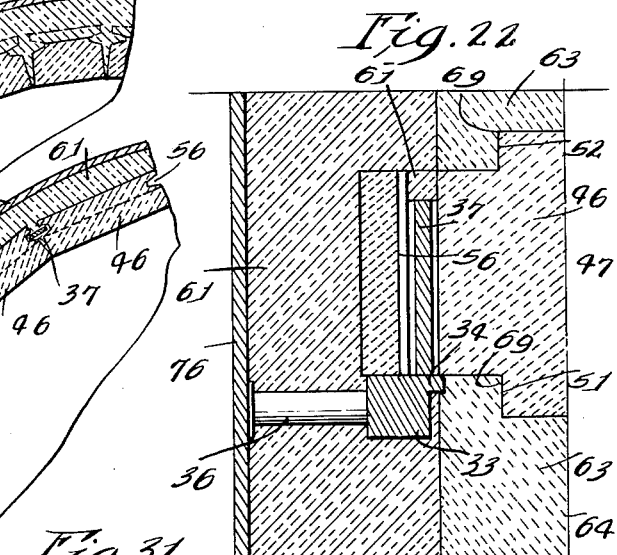

Jan. 16, 1962   L. H. HOSBEIN   3,016,655
REFRACTORY LINING
Filed April 15, 1954   6 Sheets-Sheet 6
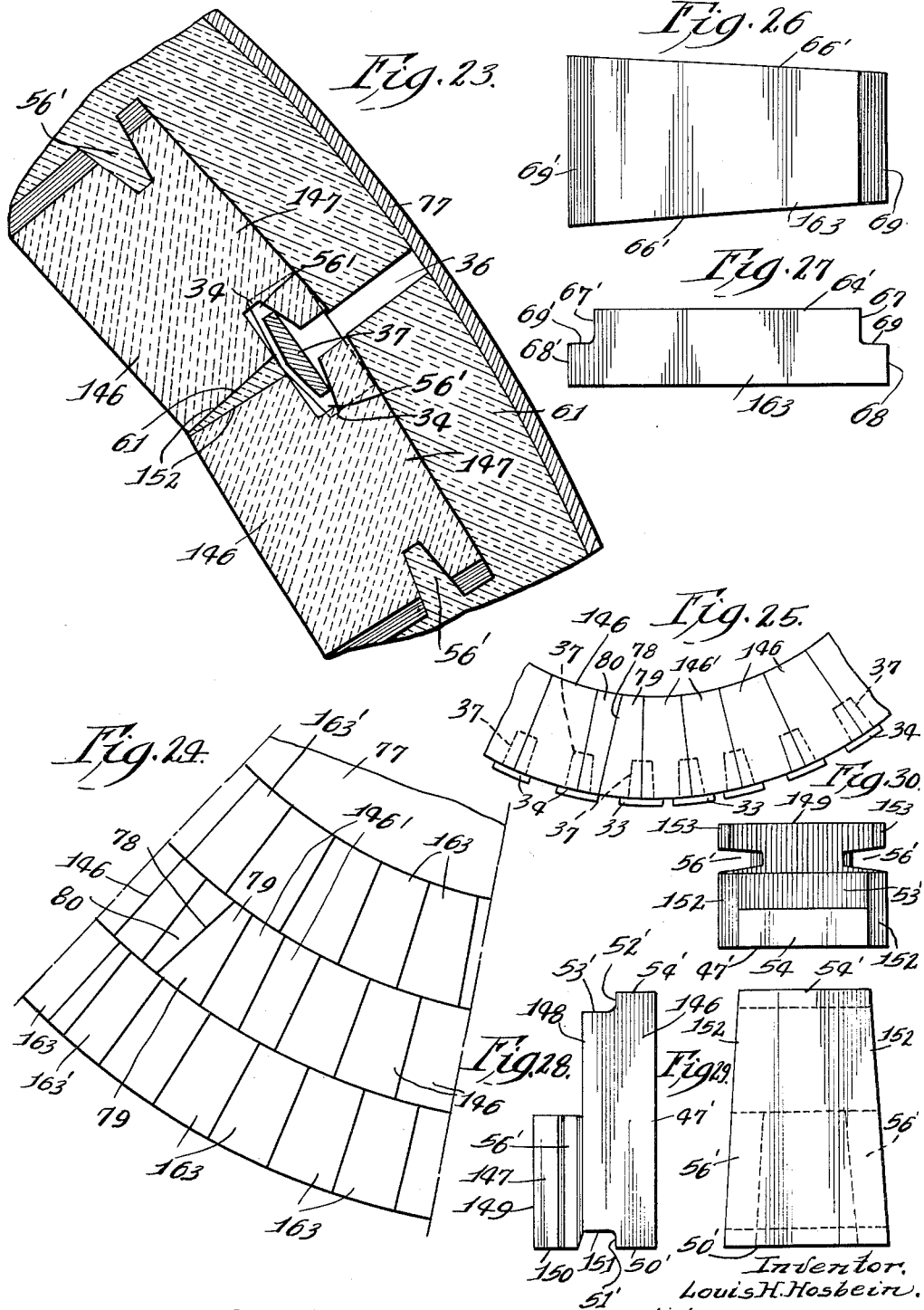
Inventor.
Louis H. Hosbein.
By Zabel, Baker, York, Jones & Dithmar
Attorneys.

United States Patent Office 3,016,655
Patented Jan. 16, 1962

3,016,655
REFRACTORY LINING
Louis H. Hosbein, Glencoe, Ill., assignor to M. H. Detrick Company, Chicago, Ill., a corporation of Delaware
Filed Apr. 15, 1954, Ser. No. 423,343
6 Claims. (Cl. 50—418)

My invention relates to refractory linings, and more particularly to a refractory lining for steel encased units.

My invention is adapted for application to a steel shell or casing for such devices as furnaces, heaters, ovens, flues, ducts and various types of vessels, whether the contour thereof is flat, curved, conical or angular.

It is one of the purposes of my invention to provide a lining of the above referred to character that is simple in structure and economical and speedy in application to any type of unit with a steel shell.

My invention comprises metal bracket members that are fixed to the metallic wall or shell and which support and hold supporting refractory members that form a portion of the refractory lining, and supported refractory members that are mounted on the supporting refractory members and cooperate with the supporting refractory members to complete the lining.

It is another important purpose of my invention to provide a refractory lining of the above referred to character that is so constructed and arranged that it has a relatively thin refractory face with an insulating layer between the metallic casing or wall and the refractory members that form the lining, consisting of a combination of block insulation and poured castable heat insulating material so that the major portion of the space between the refractory members and the metallic wall is filled with insulating material to thus reduce to a minimum the transfer of heat from the refractory lining to the metallic structure.

It has been customary to line certain structures that have steel walls or casings with a refractory lining that is applied in a plastic condition and is thus cast within or on the inner face of the wall that is to be lined. Such refractory linings are inclined to crack and portions thereof spall or break away due to the fact that it is impossible to cure this lining uniformly and because no means is provided to take care of expansion and contraction in the structure. In my improved lining the refractories are sectionally supported by the metallic mounting members or brackets and the lining is capable of expansion and contraction without damage to the individual components thereof. Also, in case of damage in any manner to any of the refractory units, these can be readily replaced without rebuilding or repairing the entire lining.

Due to the fact that the lining is made up of a refractory heat exposed layer and an insulating layer between said refractory heat exposed layer and the metallic outer structure the heat loss through the lining is reduced to a minimum. The maximum amount of heat insulation for the thickness of the lining and of the refractory material is obtained by providing supported refractory members that are thinner than the supporting refractory members, whereby a relatively thick block insulation can be placed between said supported refractory members and the metallic wall. The supporting refractory members are preferably so constructed that the metallic holding means therefor that is connected with the metallic wall is located outwardly or toward said metallic wall from the outer face of the supported refractory members to thus put said metallic members in a zone in which the heat from the heat exposed face of the wall will be much smaller than if said metallic means were not substantially surrounded by heat insulating material.

It is a further purpose of my invention to provide a lining that is made up of such supporting refractory members and supported refractory members arranged in horizontal rows, with the rows of supporting and supported refractory members alternating, said refractory members having cooperating shoulders whereby the heat exposed faces of the rows of refractory members are kept in alignment with each other.

It is a further specific purpose of my invention to provide a metallic bracket means that is provided with a stem portion, the end of which is fixedly secured to the inner face of the metallic wall, as by welding, and which has a shelf portion thereon supporting the supporting refractory members, and upstanding means thereon engaging in grooves in said supporting refractory members to hold them in position on the metallic bracket members and in properly spaced relation to the metallic wall, said upstanding means comprising, under certain circumstances, an elongated finger extending substantially perpendicularly upwardly from the inner edge of said shelf portion, and under other circumstances, an upstanding flange that is elongated horizontally and extending substantially perpendicularly to the upper surface of said shelf portion.

It is still a further specific purpose of my invention to provide supporting refractory members that are provided with vertical grooves in the end faces thereof and a horizontal groove in the bottom face thereof for cooperation with the two forms of metallic bracket members above referred to, said supporting refractory members being made either generally rectangular in character or tapering, depending upon the character of metallic wall or shell to which the same are applied as a lining.

Other objects and advantages of my invention will appear as the description of the drawings proceeds. I desire to have it understood, however, that I do not intend to limit myself to the particular details shown or described, except as defined by the claims.

In the drawings:

FIG. 3 is a similar view of a completed lining on the wall illustrated.

FIG. 4 is a perspective view of one form of metallic bracket member used in my lining construction as viewed from one side thereof.

FIG. 5 is a similar view as viewed from the other side thereof.

FIG. 6 is a perspective view of a modified form of metallic bracket member.

FIG. 7 is a fragmentary face view of a lining applied to a flat wall.

FIG. 8 is a section thereof taken on the line 8—8 of FIG. 7.

FIG. 9 is a section thereof taken on the line 9—9 of FIG. 7 on a somewhat enlarged scale.

FIG. 10 is a fragmentary sectional view of a portion of a lining adjacent an opening in a flat wall.

FIG. 11 is a similar view of another opening in the wall, showing a closure member in position over said opening.

FIG. 12 is a face view of one of the supported refractory members as viewed from the outer side thereof.

FIG. 13 is an end elevation thereof.

FIG. 14 is a face view as viewed from the inner or heat exposed side of a supporting refractory member.

FIG. 15 is a plan view thereof.

FIG. 16 is a section taken on the line 16—16 of FIG. 14.

FIG. 17 is an end elevation of the supporting refractories shown in FIG. 14.

FIG. 18 is an enlarged fragmentary sectional view showing the details of construction of one of the grooves in the supporting refractory member.

FIG. 19 is a fragmentary view partly in vertical section and partly in inside elevation of a cylindrical wall with my refractory lining applied thereto.

FIG. 20 is a fragmentary vertical sectional view through the upper portion of a tank-like member having a conical upper wall portion and a cylindrical lower wall portion to which my improved refractory lining is applied.

FIG. 21 is a section taken on the line 21—21 of FIG. 20.

FIG. 22 is a fragmentary vertical sectional view through the cylindrical portion of the tank-like member shown in FIG. 20, on an enlarged scale.

FIG. 23 is a fragmentary section taken on the line 23—23 of FIG. 20.

FIG. 24 is a fragmentary development in a plane of a portion of the lining of the conical wall shown in FIG. 20, also showing a fragmentary portion of the conical wall developed in a plane.

FIG. 25 is a development in a plane of a fragmentary portion of one of the rows of horizontally adjacent refractory supporting members provided on the conical wall portion shown in FIG. 20.

FIG. 26 is an inside face view of one of the supported refractory members in the conical wall portion.

FIG. 27 is an end elevation of the refractory member shown in FIG. 26.

FIG. 28 is an end elevation of a supporting refractory member.

FIG. 29 is an inside face view thereof.

FIG. 30 is a plan view of the supporting refractory member shown in FIG. 28, and FIG. 31 is a fragmentary sectional view on an enlarged scale taken on the line 31—31 of FIG. 20.

Figure 2:
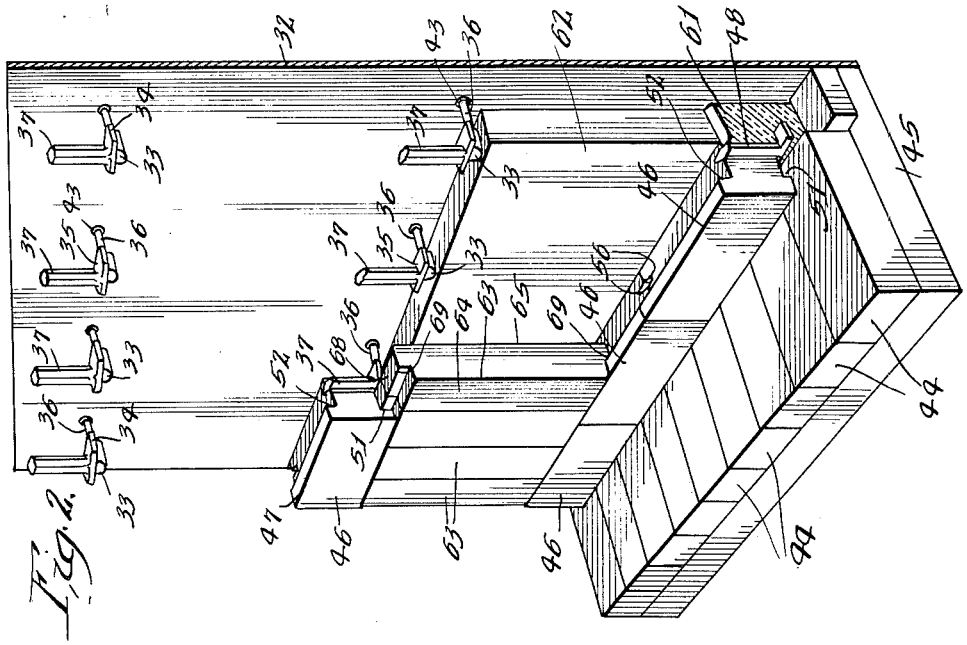
FIG. 2 is a similar view showing a further step in the assembly of the lining on said wall.
Figure 1:
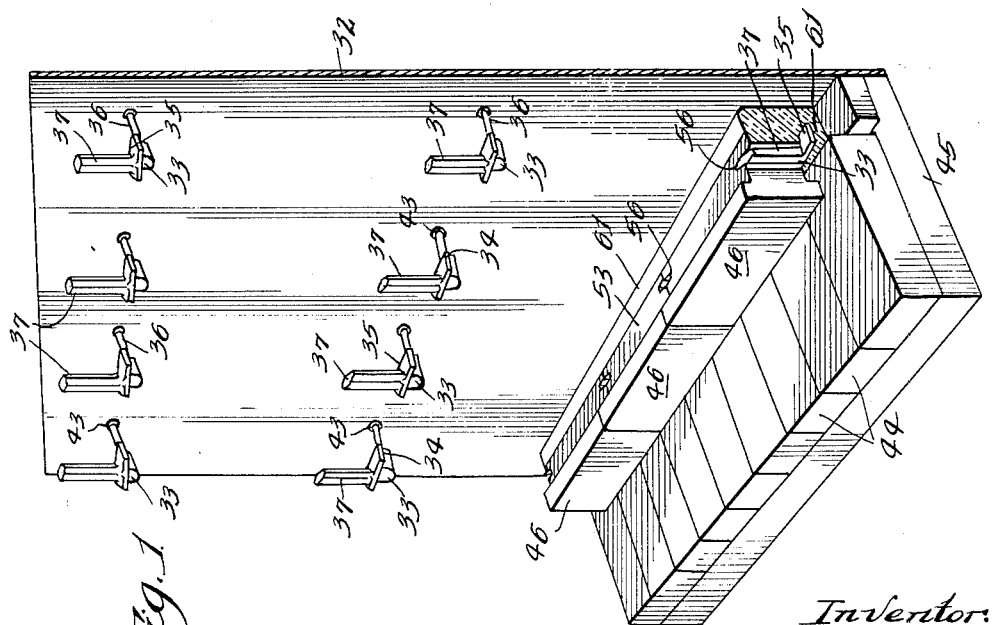
FIG. 1 is a perspective view showing a portion of a metallic wall to which my improved lining is to be applied, the metallic bracket members being shown in position thereon and some of the supporting refractory members being shown thereon, said figure illustrating the first step in building up a lining embodying my invention.

Referring in detail to the drawings, a section 32 of a flat metallic wall is shown in FIGS. 1, 2 and 3, to which metallic brackets are applied, which are shown in detail in FIGS. 4 and 5. Said brackets 33 comprise a body portion that has a shelf portion 34 thereon provided with a flat top face 35. Below the top face of the shelf portion 35 a stem 36 extends from said body portion of the bracket, said stem portion being preferably the shank portion of a stud which is cast in the body portion of the bracket with the shank extending therefrom. Said brackets have an upstanding finger portion 37 thereon, which extends upwardly from the top flat face 35 of the shelf portion 34 perpendicularly thereto. Said finger has a flat vertical face 38 directed toward the stem portion 36 and tapers in an upward direction, the opposite vertical edges 39 thereof being inclined toward each other in an upward direction. The face of the finger 37 that is remote from the stem portion 36 has a pair of flat surfaces 40 thereon that are inclined toward each other and which have the same angular relationship to each other as the inclined inner edge portions 41 of the shelf portion 34. Thus the finger 37 extends in a generally perpendicular direction to the face 35 of the shelf 34.

The end 42 of the stem portion 36 is secured to the wall 32 by a weld, as indicated at 43, each of said brackets being thus welded in fixed position to the wall 32, with the upstanding finger portions 37 thereof extending substantially parallel to the wall 32, and the top faces of the shelf portions 35 extending substantially perpendicularly to the wall 32. It will be noted upon reference to FIGS. 1 to 3 inclusive, that said bracket members 33 are arranged in horizontal rows along the wall 32 and are spaced uniform distances apart in said rows and that said rows are uniform distances apart on said wall 32. The rows are spaced a considerably greater distance apart vertically than the brackets are horizontally spaced from each other.

In building up the wall refractory members of any suitable character, that are not part of my invention, indicated by the numeral 44, may be provided at the bottom of the structure mounted on a supporting surface 45 of any suitable material. My invention includes supporting refractory lining members 46, which are mounted on the metallic bracket members, and in FIG. 1 the first or lowermost horizontal row of said supporting refractory members 46 is shown in position on the lowermost of the metallic bracket members 33.

Said supporting refractory members 46 are shown more in detail in FIGS. 14 to 18 inclusive, and comprise a generally rectangular body portion which has a flat inner or heat exposed face 47, which is somewhat larger than the outer or opposite face 48 thereof, the bottom wall of said supporting refractory member 46 having portions 49 and 50 that are offset from each other to provide a shoulder 51 that aligns with a similar shoulder 52 between offset portions 53 and 54 of the top wall of said refractory member. Thus said refractory supporting member has a larger inner portion and a reduced outer portion, said larger inner portion being at the heat exposed side or face of the refractory member. It will also be noted that said refractory members 46 are substantially rectangular in character and are horizontally elongated so as to provide a relatively great spacing in a horizontal direction between the supporting means therefor, the metallic bracket members 33. The refractory members 46 are provided with end walls 55 which have vertically extending grooves 56 therein, that are somewhat tapering in character, and which extend from the bottom wall portion 49 to the top wall portion 53. Each of said refractory members 46 is also provided with a longitudinally extending groove 57 in the bottom face thereof, which is spaced the same distance from the rear face 48 of the refractory member as the grooves 56 and is of a similar cross sectional shape to the grooves 56. The cross sectional shape of the groove 57 is shown more in detail in FIG. 18 and it will be obvious that the sides 58 thereof incline toward each other toward the bottom 59 of said groove and that the bottom wall of said groove and said side walls are connected by rounding corners 60.

The refractory members 46 are mounted at their opposite ends on shelf portions 34 of adjacent brackets 33 with the bottom faces 49 thereof resting on the shelves 34 of said brackets and with the fingers 37 seated in the grooves 56 of the refractory members 46. The wall panel or section illustrated in FIGS. 1 to 3 inclusive, is only shown as of the extent appearing in said figures for purposes of illustration, as obviously the metallic wall can be of much greater length and height than illustrated. When said refractory members 46 are in position on the brackets 33 the endwise adjacent refractories 46 will each be mounted on approximately one-half of the shelf portion 34, with a finger 37 extending between a pair of said endwise adjacent refractories.

After a horizontal row of refractories 46 is in position, heat insulating material 61 in a plastic condition is poured into the space between the refractory members 46 and the wall 32 and leveled up substantially with the top faces 53 of said refractories, said heat insulating material flowing in the space between the outer ends 48 thereof and the wall 32 and around the portions of the brackets 33 that extend between said refractories and the wall 32. Also at the lowermost row of brackets 33 any space that may remain under the metallic bracket members 33 is filled by said heat insulating material 61 and this is also true of any space in the grooves 56 above the upper ends of the fingers 37 that is not occupied by said fingers. Next the blocks 62 of heat insulating material are placed between the cast heat insulating material 61 and the bottom portions of the next adjacent higher row of brackets 33 and the refractory members 63, which are the supported refractories, are placed in position inwardly from the heat insulating blocks 62, a few of said refractory members 63 being shown in position in FIG. 2.

Said refractories 63, which are the supported, refractories, are generally rectangular in character and vertically elongated, having flat inner heat exposed faces 64 and flat outer faces 65 parallel thereto and parallel vertical end faces 66. The upper and lower end walls of said refractories 63 are provided with wall portions 67 and 68 which are offset from each other, as will be obvious from FIG. 13, to provide a shoulder 69 between the same. The refractory members 63 are reversible, in that either end thereof can be used as the upper end. This is also true to a certain extent of the supporting refractories 46, it being immaterial whether the wall with the groove 57 therein is upward or downward under circumstances where the fingers 37 engage in the grooves 56 to hold the refractories in position. There are, however, circumstances under which the wall portions 49 and 50 of said refractories with the groove 57 in said wall portion 49 must be used as the bottom wall of such refractories, as will be described below.

The refractories 63 are mounted in position with a shoulder 69 of each thereof in engagement with a shoulder 52 of a refractory 46, upon which said refractory 63 is mounted, and a shoulder 69 at the upper end of each of said refractories 63 engages a shoulder 51 on the next higher row of supported refractories 46. The shoulders 69, 51 and 52 are all spaced substantially the same distance from the flat heat exposed faces 64 and 47 of said refractories so that the heat exposed faces of the supported and supporting refractories will be in alignment when said shoulders are in engagement.

While it is possible to provide blocks of insulating material 62 of such a thickness that these will fit snugly between the faces 65 of the refractories 63 and the wall 32, should such snug fit not exist, then the heat insulating material 61 in plastic condition is poured into the space between the blocks 62 and the refractories 63, as illustrated in FIG. 3, said heat insulating material in a plastic condition flowing under the brackets 33 in the manner shown in FIG. 3 to fill said space between the members 63 and 62 when the members 46 of the next higher row have been placed in position and the heat insulating plastic material poured between the outer faces of the refractories 46 and the wall 32 in the manner previously described. The same procedure is continued up the wall for each succeeding horizontal row of horizontally adjacent refractories 46 and 63 until the entire wall that is to be lined has had the refractory members and the heat insulating material applied thereto in the manner above referred to.

The bracket 33' shown in FIG. 6 is provided for use at locations where the bracket 33 having the finger 37 thereon can not be utilized. Said bracket 33' is substantially the same in construction as the bracket 33 except for the holding means provided thereon. The shelf portion 34 has the flat face 35 thereon and has the inclined edges 41, as in the case of the bracket 33, and has the stem portion 36 thereon, which is secured to the wall 32 in the same manner as previously described. However, instead of providing a finger extending upwardly from the flat face 35, a relatively low flange 70 is provided, which has a vertical wall 71 that is perpendicular to the face 35, said wall facing the wall 32 when the bracket 33' is put in position, and has inner faces 72 that extend at the same angle to each other as the inner edge portions 41 of the shelf portion 34.

In FIG. 10 an opening 73 is shown in a wall that is provided with my improved refractory lining. Below the opening 73 the refractory members 46 forming the lower margin of the opening are mounted on the brackets 33 with the fingers 37 in the slots 56, the insulating material shown being of the same character as previously described and bearing the same reference numerals in FIG. 10 as in the other figures of the drawings. At the upper margin of the opening 73 it is desirable to have the refractory members 46 supported in such a manner that the metallic bracket members do not lie within said opening. In order to accomplish this the bracket 33' is utilized, the stem portion 36 thereon being welded to the wall 32 to one side of the opening 73 and the flange 70 being seated in the bottom groove 57 of the refractory 46 to hold said refractory 46 in position on the shelf portion 34 and to definitely locate the same relative to the wall 32 and the inner face of the refractory lining.

In FIG. 11 an access opening 74 is shown in a wall which is provided with my improved refractory lining. The metal wall 32 has an opening therein that is closed by means of the door 75, of any desired character, and said opening 74 being of considerable size, it is impossible to mount the refractory 46 in such a manner that there will be no metallic bracket within the opening 74, this being only possible in the case of small openings where the refractories can be adequately supported from points beyond the opening in the wall. As the refractories are more satisfactorily mounted on the brackets 33 having the fingers 37 thereon, the brackets 33 are used along the top margin of the opening 74, the metallic wall 32 being overlapped by the door 75 sufficiently that the stem portion 36 of the bracket 33 can be welded to the marginal edge of the wall 32 that extends down inside the door 75 sufficiently for this purpose. The refractory blocks 46 and 63 are the same as previously described and bear the same reference numerals in this figure as in the previously described figures, and the insulating material is of the same character as previously described and bears the same reference numerals in this figure as in the previously described figures in which it is shown.

Said refractory lining can be applied as well to a curved wall as to a flat wall, such as shown in FIGS. 1 to 3 inclusive, and 7 to 11 inclusive, as it is only necessary that the inner faces of the refractories be in close adjacency to form a refractory face on the lining on the heat exposed side thereof.

In FIG. 31 the refractory members 46 are shown as being mounted on a cylindrical wall 76 of a tank or similar cylindrical walled member, the fingers 37 of the metal brackets being mounted in the grooves 56 of said members 46 in the same manner as previously described, and the stem portions 36 of said brackets being welded to the inner face of the wall 76 to hold the same in position in horizontal rows on said wall. The length of the brackets 46 can be reduced if this is found to be desirable, should the radius of the wall 76 to be so small that this is necessary in order that said refractory members can be properly mounted on the wall to form a suitable refractory lining therefor.

A fragmentary portion of a tank-like member having such a wall 76 is also shown in FIG. 20, and it will be obvious that the refractory members 46 have the refractory members 63 mounted thereon in the same manner as previously described, the shoulders thereon interengaging to vertically align the members 46 and 63 on the heat exposed faces thereof. In this form of the invention the block insulation is not utilized, but the plastic heat insulation is put in place behind the members 46 and 63 by pouring in the same manner as described above. The interengaging shoulder portions 69 and 51 and 52 of the refractory members 63 and 46 are more clearly shown in FIG. 22, which also shows the finger 37 on the bracket 33 in position in the groove 56, and it will be obvious that the heat insulating material 61 enters the upper portion of said groove 56 above the upper end of the finger 37 when it is poured into the space between the wall 76 and the refractory blocks 46.

It will be noted upon reference to FIG. 19, in which a portion of such a cylindrical walled metal container is shown in inside elevation, that the refractory members 46 are elongated circumferentially of the wall 76 and the refractory members 63 are elongated vertically of the wall 76, thus having a similar relationship to each other as the refractory members 47 and 63 in the case of the flat wall 32. As the circumference of the wall 76 may be such that a full length member 46 may not be capable of insertion at the end of a horizontal circumferentially extending row of said refractories, a shorter refractory 46' having the same shape at the ends thereof and the top and bottom thereof as the refractory 46, may be inserted, being preferably trimmed off to the proper length to fit in the space that remains after all of the full length refractories 46 have been placed in position. Also, if the refractories 63 of a horizontal row do not completely fill one of such horizontal rows and a narrow space remains than the width of one of said refractories 63, a narrower refractory 63' can be inserted as the next one in such horizontal circumferentially extending row, being formed by trimming down the width of one of said refractories 63.

A slightly modified form of refractory members has to be utilized where a curved wall is provided that tapers, such as a conical wall or a concavely curved dome-like wall. A conical wall is shown in FIG. 20 above the wall 76 and the details of construction of said refractory members utilized in said wall are shown in FIGS. 26 to 30 inclusive. One of the supported refractories for such a tapering curved wall is shown in FIGS. 28 to 30 inclusive, said tapering refractories 146 having a main body portion as shown in FIG. 28, and a reduced rearward extension 147, which is provided with grooves 56', similar to the grooves 56 provided in the refractories 46. Said tapering refractory also has a flat inner heat exposed face 47' and an outer face 148 that is parallel to the face 47' in the main body portion thereof, and a similar face 149 on the rearward reduced extension 147. The top wall of said refractory 146 is provided with wall portions 53' and 54' defining the shoulder 52' corresponding to the shoulder 52 on the refractories 46, but the bottom wall is provided with a wall portion 50' that corresponds to the wall portion 50 of the refractory 46 and a wall portion 150 on the rearwardly extending portion 147 that is in alignment with the wall portion 50' defining a relatively wide groove 151 providing a shoulder at 51' corresponding to the shoulder 51 of the refractory 46.

Said refractories 146 taper in an upward direction, the side walls 152 of the main body portion thereof being inclined toward each other in an upwardly extending direction. The rearward extension 149 also tapers similarly at 153, the wall portions 152 and 153 being substantially parallel to each other. The refractories 146 are supported in substantially the same manner as the refractories 46, the same metallic brackets being used for securing said refractories 146 in position as are used for securing the refractories 46 in position on the wall.

Referring to FIGS. 20, 21 and 23, a conical wall portion 77 is shown, which is provided with the metallic bracket members previously described having the stem portions 36 welded thereto and having the upstanding fingers 37 that are received in the grooves 56' in the reduced extensions 147 at adjoining ends of the refractories 146. Said refractories have the wall portions 150 thereof mounted on the top faces of the shelf portions 34 of said brackets and are thus mounted in substantially the same manner as the refractories 46. The heat insulating material 61 is poured in a plastic condition into the spaces between the refractories 146 at their diverging wall portions 152 and between the wall 77 and the refractories 146 so as to fill the spaces left between the main body portions 146, the reduced extensions 147 and the wall 77.

Cooperating with the refractories 146 are the supported refractories 163, which are similar to the refractories 63, having upper and lower end walls that are provided with wall portions 67' and 68' corresponding to the wall portions 67 and 68 of the refractories 63 and providing shoulders 69' corresponding to the shoulders 69 referred to in connection with the refractories 63. However, said refractories 163 taper longitudinally, the side walls 66' thereof converging toward the upper ends of said refractories, as will be obvious from FIG. 26.

Said refractories 163 are mounted on the refractories 146 in substantially the same manner as the refractories 63 are mounted on the refractories 46 with the shoulders 69' in engagement with the shoulders 51' and 52' so that the heat exposed faces 47' and 64' of the refractories 163 and 146 will be in substantial alignment with each other, as shown in FIG. 20. Heat insulating material 61 is poured between the refractories 163 and wall 77 and into any spaces between circumferentially adjacent refractories 163.

A fragmentary portion of a single circumferential row of the refractories 146 and their metallic supporting brackets 33 is shown somewhat diagrammatically and developed in a plane in FIG. 25 to illustrate the manner in which said refractories are assembled with said bracket members. Inasmuch as the refractories 146 are of a standard size, it is frequently necessary to provide for a somewhat closer spacing of the brackets 33 at one location around the circumference of the wall in each horizontal row to accommodate a pair of refractories 146' that are somewhat narrower than the refractories 146, but of the same shape in cross section and tapering similarly. Also, in order to assemble the refractories 146 in a wall portion, such as the conical wall portion 77, these refractories have to be passed downwardly along said wall over the fingers 37. Because of their tapering characteristic, the last refractory 146 cannot be assembled without splitting the same, as shown at 78, dividing the same into two oppositely tapering portions 79 and 80. The portion 79 is first slid into position in engagement with the finger 37 on the bracket 33, upon which it is mounted, and the portion 80 is then slid into position on the finger 37 of the bracket 33 in which this portion is mounted, thus completing the horizontal row of circumferentially extending refractories 146.

FIG. 24 shows the relationship of the various refractories of adjacent circumferential rows to each other diagrammatically and illustrates the manner in which the rows are completed, showing one row of supporting refractories and two rows of supported refractories, the view being a development into a plane of said refractories mounted on a fragmentary portion of the conical wall 77. The pair of refractories 146' reduced in width as well as the split refractory 146 being shown in said figure, and also in the supported refractories, refractories 163' are shown in each row thereof to illustrate the reduction in width of said refractories 163 at one location in a circumferential series thereof to fill the space remaining between the last two full sized refractories 163. The size of the refractories 163', as well as the refractories 146', will vary in accordance with the space that these would have to fill.

It will be obvious that in all forms of the invention described above a metallic wall is provided with metallic bracket members that have shelf portions and holding portions that engage supporting refractories for holding the same in position in horizontal rows on the wall, and that said supporting refractories have mounted thereon supported refractories, the horizontal rows of supporting and supported refractories alternating in the refractory lining of the metallic wall, and that there is heat insulating material between the metallic wall and said refractories with the major portion of the lining made up of the supported refractories due to their great length, which portions are provided with a thicker layer of heat insulating material due to the fact that said supported refractories are thinner than the supporting refractories.

What I claim is:

1. The combination with a metallic wall, of a refractory lining for said wall comprising horizontal rows of grooved horizontally elongated supporting refractories and horizontal rows of vertically elongated refractories supported thereon, each row of supporting refractories being widely vertically spaced from the next vertically adjacent row of supporting refractories and a single row of supported refractories lying between each pair of vertically adjacent rows of supporting refractories, the supported refractories being of much greater length than the width of either said supported or supporting refractories and being supported by and extending from the row of supporting refractories below the same to the row of supporting refractories above the same and means for mounting said supporting refractories on said wall comprising metal brackets mounted on said wall, each having a flat faced refractory supporting portion at its inner end spaced from said wall and an elongated groove engaging portion extending upwardly from said supporting portion at the inner marginal extremity thereof, said groove engaging portions of said brackets extending lengthwise in grooves of the supporting refractories seated on said supporting portions of said brackets to hold said supporting refractories in spaced relation to said wall, inwardly facing shoulders on said supported refractories and outwardly facing shoulders on said supporting refractories, said shoulders interengaging and being spaced from the inner faces of said refractories to align the inner faces of said supported refractories with the inner faces of said supporting refractories, said supported refractories being thinner than said supporting refractories to space the outer faces of said supported refractories at a greater distance from said wall than the outer faces of said supporting refractories, said grooves in said supporting refractories being outwardly spaced from said shoulders a distance to locate all portions of said brackets outwardly from the outer faces of said supported refractories.

2. The combination with a metallic wall, of a refractory lining for said wall comprising horizontal rows of horizontally elongated supporting refractories having grooves in the end faces thereof extending parallel to the heat exposed faces thereof and horizontal rows of vertically elongated refractories supported thereon, each row of supporting refractories being widely vertically spaced from the next vertically adjacent row of supporting refractories and a single row of supported refractories lying between each pair of vertically adjacent rows of supporting refractories, the supported refractories being of much greater length than the width of either said supported or supporting refractories and being supported by and extending from the row of supporting refractories below the same to the row of supporting refractories above the same and means for mounting said supporting refractories on said wall comprising metal brackets mounted on said wall, each having a flat faced refractory supporting portion at its inner end spaced from said wall and an elongated tapering finger extending upwardly from said supporting portion at the inner marginal extremity thereof, said fingers extending lengthwise in the grooves of the supporting refractories seated on said supporting portions of said brackets to hold said supporting refractories in spaced relation to said wall, inwardly facing shoulders on said supported refractories and outwardly facing shoulders on said supporting refractories, said shoulders interengaging and being spaced from the inner faces of said refractories to align the inner faces of said supported refractories with the inner faces of said supporting refractories, said supported refractories being thinner than said supporting refractories to space the outer faces of said supported refractories at a greater distance from said wall than the outer faces of said supporting refractories, said grooves in said supporting refractories being outwardly spaced beyond said shoulders a distance to locate all portions of said brackets outwardly from the outer faces of said supported refractories.

3. The combination with a metallic wall, of a refractory lining for said wall comprising horizontal rows of grooved horizontally elongated supporting refractories and horizontal rows of vertically elongated refractories supported thereon, each row of supporting refractories being widely vertically spaced from the next vertically adjacent row of supporting refractories and a single row of supported refractories lying between each pair of vertically adjacent rows of supporting refractories, the supported refractories being of much greater length than the width of either said supported or supporting refractories and being supported by and extending from the row of supporting refractories below the same to the row of supporting refractories above the same and means for mounting said supporting refractories on said wall comprising metal brackets fixed to said wall, said brackets having each a stem portion secured at its outer end to said wall, a flat top faced refractory supporting shelf portion, means at the other end of said stem portion mounting said shelf portion above said stem portion and a projection extending upwardly at the inner margin of said shelf portion from said flat top face, said supported refractories having bottom faces seated on said shelf portions, said projections engaging in grooves of the supporting refractories seated on said shelf portions to hold said supporting refractories in spaced relation to said wall, inwardly facing shoulders on said supported refractories and outwardly facing shoulders on said supporting refractories, said shoulders interengaging and being spaced from the inner faces of said refractories to align the inner faces of said supported refractories with the inner faces of said supporting refractories, said supported refractories being thinner than said supporting refractories to space the outer faces of said supported refractories at a greater distance from said wall than the outer faces of said supporting refractories, said grooves in said supporting refractories being outwardly spaced from said shoulders a distance to locate all portions of said brackets outwardly from the outer faces of said supported refractories, and all portions thereof except said upwardly extending projections being below said bottom faces of said supporting refractories seated on said shelf portions.

4. The combination with a metallic wall of a refractory lining for said wall comprising horizontal rows of horizontally elongated supporting refractories having grooves in the end faces thereof extending parallel to the heat exposed faces thereof and horizontal rows of vertically elongated refractories supported thereon, each row of supporting refractories being widely vertically spaced from the next vertically adjacent row of supporting refractories and a single row of supported refractories lying between each pair of vertically adjacent rows of supporting refractories, the supported refractories being of much greater length than the width of either said supported or supporting refractories and being supported by and extending from the row of supporting refractories below the same to the row of supporting refractories above the same and means for mounting said supporting refractories on said wall comprising metal brackets fixed to said wall, said brackets having each a flat top faced refractory supporting shelf thereon at its inner end spaced from said wall and an upwardly elongated finger on each of said shelf portions projecting upwardly from said flat top face at the inner margin of said shelf, said supported refractories having bottom faces seated on said shelves, said fingers engaging in the grooves of the supporting refractories seated on said shelves to hold said supporting refractories in spaced relation to said wall, inwardly facing shoulders on said supported refractories and outwardly facing shoulders on said supporting refractories, said shoulders interengaging and being spaced from the inner faces of said refractories to align the inner faces of said supported refractories with the inner faces of said supporting refractories, said supported refractories being thinner than said supporting refractories to space the outer faces of said supported refractories at a greater distance from said wall than the outer faces of said supporting refractories, said grooves in said supporting refractories being outwardly spaced beyond said shoulders a distance to locate all portions of said brackets outwardly from the outer faces of said supported refractories, and all portions thereof except said fingers being below said bottom faces of said supporting refractories seated on said shelves.

5. The combination with metallic supporting means of a thin refractory wall comprising horizontal rows of grooved horizontally elongated supporting refractories and horizontal rows of vertically elongated refractories supported thereon, each row of supporting refractories being widely vertically spaced from the next vertically adjacent row of supporting refractories and a single row of supported refractories lying between each pair of vertically adjacent rows of supporting refractories, the supported refractories being of much greater length than the width of either said supported or supporting refractories and being supported by and extending from the row of supporting refractories below the same to the row of supporting refractories above the same and means for mounting said supporting refractories on said metallic supporting means comprising metal brackets mounted thereon each having a flat faced refractory supporting portion at its inner end spaced from said metallic supporting means and an elongated groove engaging portion extending upwardly from said refractory supporting portion at the inner marginal extremity thereof, said groove engaging portions of said brackets extending lengthwise in grooves of the supporting refractories seated on said supporting portions of said brackets to hold said supporting refractories in spaced relation to said metallic supporting means, inwardly facing shoulders on said supported refractories and outwardly facing shoulders on said supporting refractories, said shoulders interengaging and being spaced from the inner faces of said refractories to align the inner faces of said supported refractories with the inner faces of said supporting refractories, said supported refractories being thinner than said supporting refractories to space the outer faces of said supported refractories at a greater distance from said metallic supporting means than the outer faces of said supporting refractories, said grooves in said supporting refractories being outwardly spaced from said shoulders a distance to locate all portions of said brackets outwardly from the outer faces of said supported refractories.

6. The combination with a metallic wall, of vertically spaced horizontal rows of horizontally spaced metallic brackets mounted on said wall, each of said brackets having a stem portion projecting therefrom toward said wall and secured at its outer extremity to said wall, a shelf portion at the inner end of said bracket providing a supporting surface elevated above said stem portion perpendicular to said wall and spaced from said wall and a holding member projecting upwardly from said supporting surface at the margin thereof remote from said wall, all of each of said brackets except said holding member being located below said supporting surface, a horizontal row of supporting refractories mounted on said shelf portion of each horizontal row of said brackets, said supporting refractories having reduced outer portions defining outwardly directed longitudinal shoulders on the top and bottom sides of said refractories, said reduced outer portions each having a groove extending from end to end of said bottom side in parallel outwardly spaced relation to said shoulder and a groove in each end thereof aligning with said groove in said bottom side and extending from the bottom side to the top side of said reduced portion, said holding members being seated in certain of said grooves, a horizontal row of vertically elongated supported refractories mounted on each row of said grooved refractories, said supported refractories having shoulders on the ends thereof engaging the shoulders on said supporting refractories, said interengaging shoulders being spaced from the inner faces of said supported refractories to align said inner faces of said supporting and said supported refractories with all said refractories spaced from said wall, said supported refractories being of much greater length than width and thinner than said supporting refractories to space the outer faces of said supported refractories further from said wall than the outer faces of said supporting refractories, and said grooves being spaced outwardly a distance from said shoulders to locate the brackets having their holding members engaging in said grooves outwardly beyond the outer faces of said supported refractories.

References Cited in the file of this patent

UNITED STATES PATENTS

| | | |
|---|---|---|
| 2,005,427 | Lenke | June 18, 1935 |
| 2,084,225 | Slaughter et al. | June 15, 1937 |
| 2,239,588 | Cassady | Apr. 22, 1941 |
| 2,369,100 | Young | Feb. 6, 1945 |
| 2,460,052 | Werner | Jan. 25, 1949 |
| 2,482,618 | Hosbein | Sept. 20, 1949 |
| 2,581,989 | Weber | Jan. 8, 1952 |
| 2,674,871 | Hosbein | Apr. 13, 1954 |
| 2,705,414 | Rose | Apr. 5, 1955 |

FOREIGN PATENTS

| | | |
|---|---|---|
| 328,651 | Great Britain | May 8, 1930 |
| 684,851 | Great Britain | Dec. 24, 1952 |